United States Patent

Yoneyama

[11] Patent Number: 5,771,749
[45] Date of Patent: Jun. 30, 1998

[54] SLIDE MECHANISM COMBINED ROUGH AND FINE ADJUSTMENT IN MICROMANIPULATOR

[75] Inventor: Shinji Yoneyama, Tokyo, Japan

[73] Assignee: Narishige Co., Ltd., Tokyo, Japan

[21] Appl. No.: 709,723

[22] Filed: Sep. 9, 1996

[30] Foreign Application Priority Data

Sep. 7, 1995 [JP] Japan .................................. 7-229761

[51] Int. Cl.⁶ ......................... G02B 21/26; G05G 11/00; F16H 25/20
[52] U.S. Cl. ................. 74/490.12; 74/89.15; 74/490.13; 359/392; 359/393
[58] Field of Search .............................. 74/10.54, 89.15, 74/490.12, 490.13; 269/60; 359/392, 393, 383

[56] References Cited

U.S. PATENT DOCUMENTS

| | | | |
|---|---|---|---|
| 4,189,953 | 2/1980 | Volk | 74/490.13 |
| 4,700,585 | 10/1987 | Marzhauser | 74/490.13 |
| 4,719,816 | 1/1988 | Carlnas | 74/10.54 X |
| 4,919,001 | 4/1990 | Ogiwara et al. | 74/10.54 X |

Primary Examiner—Allan D. Herrmann
Attorney, Agent, or Firm—Longacre & White

[57] ABSTRACT

A slide mechanism combined rough and fine adjustment in micromanipulator comprising an inside slider 30 provided with a rough adjustment female screw 30a in axial direction slidably fitted in recessed grooves 12a of a basic outside slider 12 in axial direction, a rough adjustment screw shaft 31 fitted into the rough adjustment female screw 30a of the inside slider 30, a fine adjustment inside slider 32 fixing the basic end part of the rough adjustment screw shaft 31 and provided with a fine adjustment female screw 32b, a rough adjustment bearing metal and concurrently fine adjustment outside slider 20 to fit and support the fine adjustment inside slider 32 non-rotatively but movably in axial direction in a through hole provided in axial direction, a fine adjustment screw shaft 33 to fit in the fine adjustment female screw 32b of the fine adjustment inside slider 32, an annular rough adjustment operation handle 23 to rotate the rough adjustment bearing metal and concurrently fine adjustment outside slider 20, a cylindrical shaped fine adjustment operation handle 28 to rotate the fine adjustment screw shaft 33. The slide mechanism 11 of the present invention offers a slide mechanism combined rough and fine adjustment sliders in one unit and said one unit slide mechanism can perform rough and fine adjustment.

1 Claim, 4 Drawing Sheets

SLIDE MECHANISM COMBINED ROUGH AND FINE ADJUSTMENT IN MICROMANIPULATOR

BACKGROUND OF THE INVENTION

1. Field of the Invention

The present invention relates to a slide mechanism combined rough and fine adjustment in micromanipulator when fine adjustment actuation is carried out under microscope.

2. Prior Art

In the field of basic medical science or biotechnology, micromanipulators to treat cells in various manners such as retaining, suctioning, pouring, dividing, or the like for organ of creatures, cellular texture, egg cells, or the like have been offered. It has been considered very important to adequately treat the cells in corresponding to an enlargement ratio of microscope when fine adjustment is carried out under microscope.

FIG. 3 is an illustration to briefly explain composition of conventional cells treatment device.

In FIG. 3 the cells treatment device comprises a stage 3 to place a petri dish 2 thereon, the petri dish 2 including the egg cells 1 dipped in a reagent therein, a fixed retaining portion 4 to fixedly retain the cells 1, a micromanipulator to carry out practical treatment of the cells, and an optical system to observe images of the cells 1 by illuminating. All these parts are integrally formed and placed on a vibration-proof mat 7.

The micromanipulator 5 is provided with various kinds of microtools 8 corresponding to respective use for cells treatment. Said micromanipulator is also provided at its foremost end with a three dimensional displacement mechanism. The three dimensional displacement mechanism is provided with X-, Y- and Z-coordinate slide mechanism 9, respectively. Each slide mechanism of X-, Y-, and Z-coordinate directions needs rough and fine adjusting actuation, respectively.

Rough adjusting actuation and fine adjusting actuation are required in the following manners. At first, an operator catches an object to be treated by microscope and selects the starting position of his adjusting actuation as quickly as possible. This operation is carried out by rough adjusting actuation. In this case actuation is carried out in smaller enlargement ratio of the microscope. Next, the operator carries out his fine adjusting actuation for cells treatment slowly and deliberately in larger enlargement ratio of the microscope. The rough adjusting actuation under smaller enlargement ratio of the microscope is hereinafter referred to as rough adjustment. The fine adjusting acutuation under larger enlargement ratio of the microscope is hereinafter referred to as fine adjustment.

FIG. 4 is a perspective view of disassembled state of conventional slide mechanism combined rough and fine adjusting actuation.

As is apparent from FIG. 4, a sliding mechanism 41 has an outside displacement board 42. The outside displacement board is hereinafter referred to as an outside slider 42. The outside slider 42 has upper inside grooves 42b and lower inside grooves 42a. A rough adjustment inside displacement board 43 is slidably fitted in the lower inside grooves 42a of the outside slider 42 with the aid of linear way bearings (not shown). The rough adjustment inside displacement board is hereinafter referred to as the rough adjustment inside slider 43. A fine adjustment inside displacement board 45 is slidably fitted in the upper inside grooves 42b of the outside slider 42 with the aid of linear way bearings (not shown). The fine adjustment inside displacement board is hereinafter referred to as the fine adjustment inside slider 45.

The rough adjustment inside slider 43 is provided with a recessed U type groove 43 on its upper plane in the direction of movement. The outside slider 42 is provided with a through hole 42c communicating the lower groove 42a and the upper groove 42b of the outside slider 42 near the one forward corner end in the direction of movement.

The fine adjustment inside slider 45 is provided with a projection 46 of small pillar pattern projecting downwardly from the lower plane surface. The projection 46 is inserted in the through hole 42c of the outside slider 42 and protruded to the U type groove 43a of the rough adjustment inside slider 43. The projection 46 is movable in the through hole 42c of the outside slider 42 and along the U type groove 43a of the rough adjustment inside slider 43.

The fine adjustment inside slider 45 is provided with a longitudinal through hole 45a in the direction of movement. A spring 47 is inserted into the longitudinal through hole 45a. One end of the spring 47 is fixedly secured in the fine adjustment inside slider 45 by a screw (not shown).

A female screw 43b is provided in a through hole communicating to the U type groove 43a of the rough adjustment inside slider 43 in the direction of movement. A rough adjustment male screw 49a of a rough adjustment screw shaft 49 is fitted in the rough adjustment female screw 43b. The rough adjustment screw shaft 49 comprises the rough adjustment male screw 49a, a basic end part 49b provided with a fixing male screw 49b-1 at the foremost end. The rough adjustment screw shaft 49 has a through hole 49c in axial direction. The basic end part 49b is inserted into a through hole provided at the center of a bearing metal 51 through an washer 50 made of plastics such as teflon or the like. The basic end part 49b is further inserted into a through hole provided at the center of a horizontal pillar part 55b of a rough adjustment handle 55 through an washer 54.

The bearing metal 51 is fixedly secured at rear end of the outside slider 42 by means of bolts 52, 52. One end of the spring 47 is fixed on the periphery at foremost end of the bearing metal 51.

The rough adjustment handle 55 comprises a cylinder part 55a of larger diameter and the pillar part 55b. The cylinder part 55a rotatively houses the bearing metal 51 in the cylinder. The cylinder part 55a is provided with knurls on the periphery thereof to be rotated by hand.

The pillar part 55b is provided with a through hole in axial direction at its center. The basic part 49b of the rough adjustment screw shaft 49 is inserted into the through hole and the fixing male screw 49b-1 is screwed to said through hole. The rough adjustment screw shaft 49 is fixed to the rough adjustment handle 55.

A male screw 55c is provided at periphery of the foremost end of the horizontal pillar part 55b of the rough adjustment handle 55. A female screw 58c provided inside the pillar part 58a of the fine adjustment handle 58 is fitted to the male screw 55c of the rough adjustment handle 55. The fine adjustment handle 58 comprises a cylinder part 58a and a pillar part 58b of larger diameter. The periphery of the pillar part 58b of the larger diameter is provided with knurls to hold said periphery and rotate it.

The fine adjustment shaft 59 is rotatively inserted into the through hole 49c of the rough adjustment screw shaft 49. One end of the fine adjustment shaft 59 contacts the projection 46 and the other end of the fine adjustment shaft 59 contacts the side of the pillar part 58b of the fine adjustment 58. The projection 46 always pushes the one end of the fine adjustment shaft 59 by means of resilient force of a spring 47 so that the opposite end of the fine adjustment shaft 59 may contact the side of the pillar part 58b of the fine adjustment handle 58.

When an operator holds the knurls on the periphery of the cylinder of the rough adjustment handle 55 and rotates the cylinder, the fine adjustment handle 58 and rough adjustment screw shaft 49 are rotated and then rough adjustment inside slider 43 is roughly displaced.

When the operator rotates the fine adjustment handle 58 by holding the knurls on the periphery of said fine adjustment handle 58 as disturbing rotation of the rough adjustment handle 55, the fine adjustment handle 58 is displaced against the rough adjustment handle 55 by screw fitting of the female screw 58c of the fine adjustment handle 58 and the male screw 55c of the rough adjustment handle 55. Accordingly, fine adjustment shaft 59 moves against resilient force of the spring 47 and the projection 46 is moved and fine adjustment inside slider 45 is finely displaced.

There have been following problems in the conventional slide mechanism combined rough and fine adjustment as described above.

(1) Conventional mechanism requires one rough adjustment slider and another fine adjustment slider. Thus construction becomes complex and the device becomes large and accordingly manufacturing cost is high.

(2) Due to complexity of construction it lacks rigidity. It is easy to generate hindrance and troubles. Accuracy is not expected.

SUMMARY OF THE INVENTION

The present invention has been made with the foregoing background in mind and its object resides in offering a simple slide mechanism combined rough and fine adjustment mechanism for micromanipulator.

According to the present invention, the slide mechanism combining rough adjustment and fine adjustment comprises a basic slider having inside grooves, a slider slidably fitted to the inside grooves of the basic slider in axial direction and provided with a rough adjustment female screw in axial direction, a rough adjustment screw shaft screwed into the rough adjustment female screw of said slider, a rough adjustment screw shaft of which basic end part being fixed, a fine adjustment inside slider provided with a fine adjustment female screw in axial direction on the same axis as that of the rough adjustment screw shaft, a rough adjustment bearing metal and concurrently fine adjustment outside slider fitting and supporting the fine adjustment inside slider in the through hole provided in axial direction of the engagement part non-rotatively but movably in axial direction, a fine adjustment screw shaft fitted with a fine adjustment female screw of the fine adjustment inside slider, an annular rough adjustment operation handle to rotate the rough adjustment bearing metal and concurrently fine adjustment outside slider, a cylindrical fine adjustment operation handle to rotate the fine adjustment screw shaft.

When said rough adjustment operation handle is rotated, said rough adjustment bearing metal and concurrently fine adjustment outside slider and said fine adjustment inside slider are rotated and said slider is roughly displaced in axial direction. On the other hand, when the fine adjustment operation handle is rotated, the fine adjustment screw shaft is rotated and said fine adjustment inside slider is finely displaced in axial direction. Accordingly, said slider is finely displaced in axial direction.

DESCRIPTION OF THE PREFERRED EMBODIMENTS

The present invention of a slide mechanism combined rough and fine adjustment mechanism in micromanipulator is explained with reference to the accompanying drawings.

Figure 1:
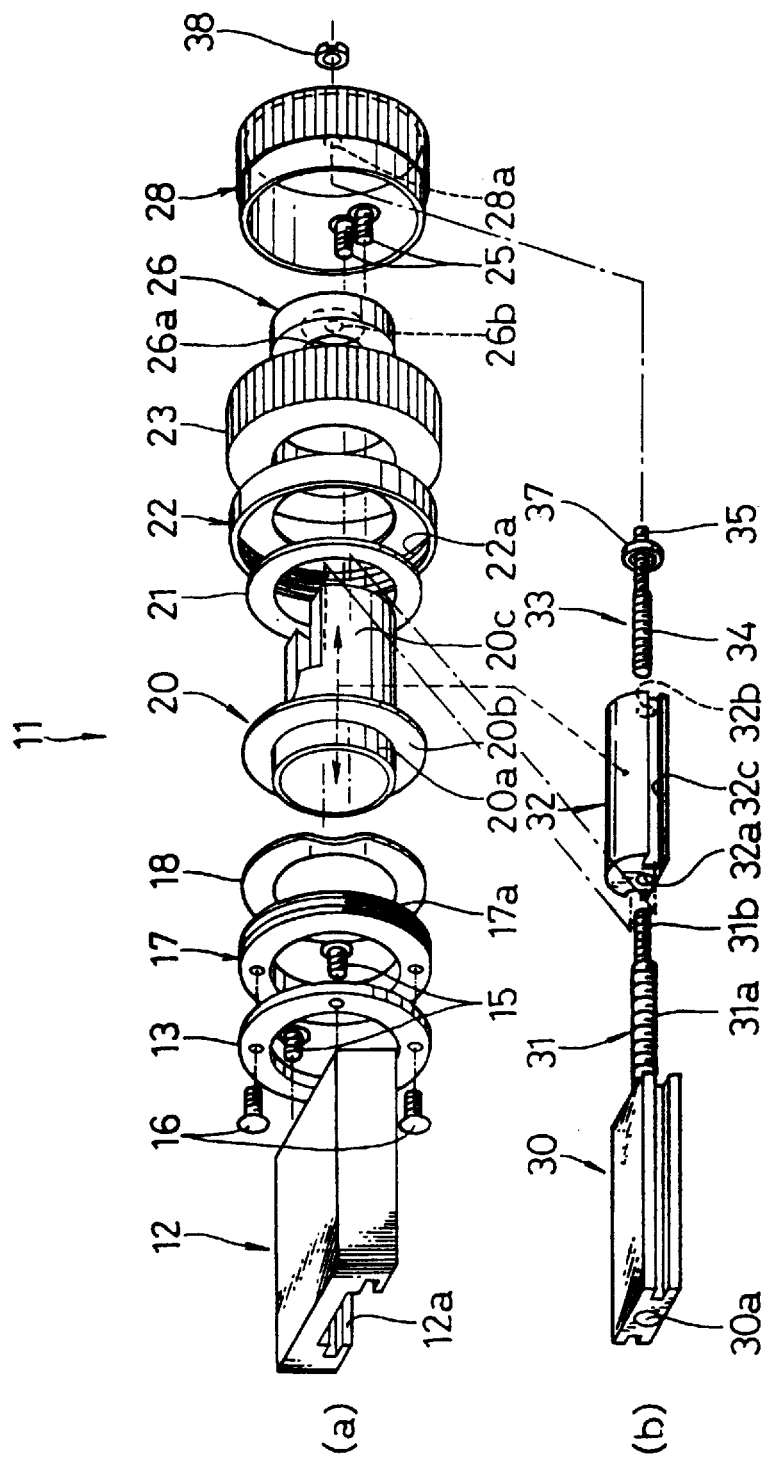
FIG. 1 shows a slide mechanism combined rough and fine adjustment according to the present invention. (a) is a perspective view of the disassembled rough adjustment and fine adjustment mechanism including operation handles. (b) is a perspective view of disassembled parts of the sliders.
Figure 2:
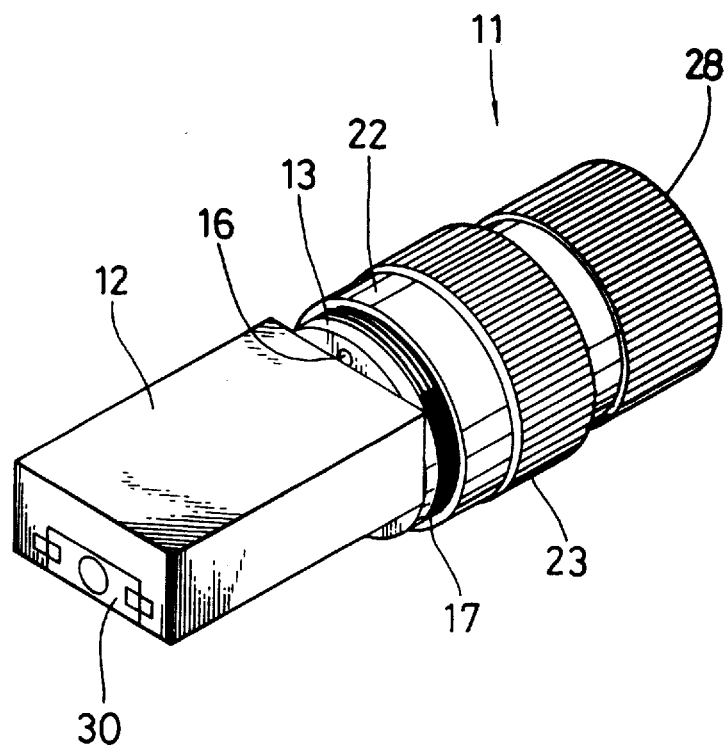
FIG. 2 is a general perspective view showing completely assembled rough and fine adjustment mechanism according to the present invention.
Figure 3:
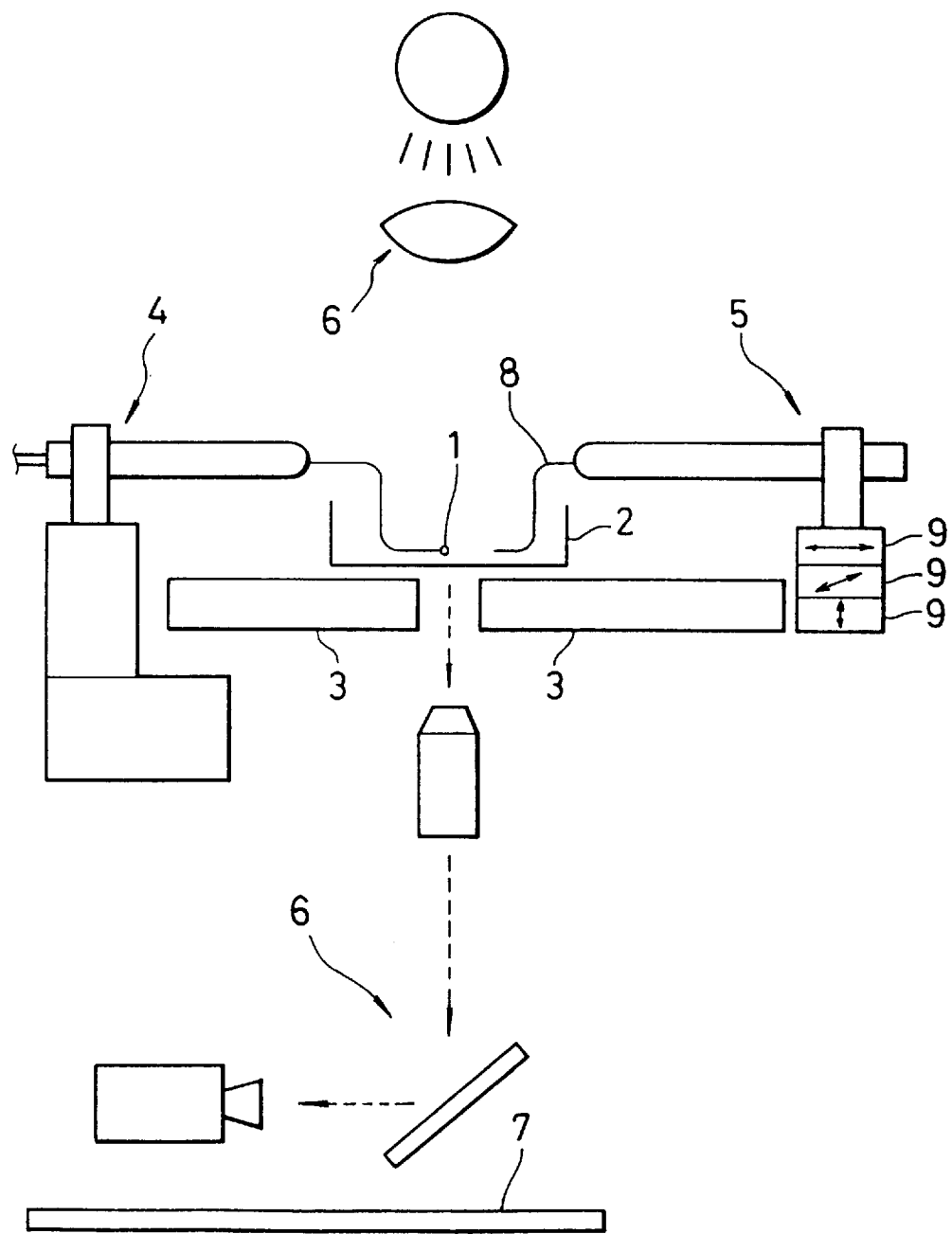
FIG. 3 is a general illustration for the composition of conventional cells treatment device.
Figure 4:
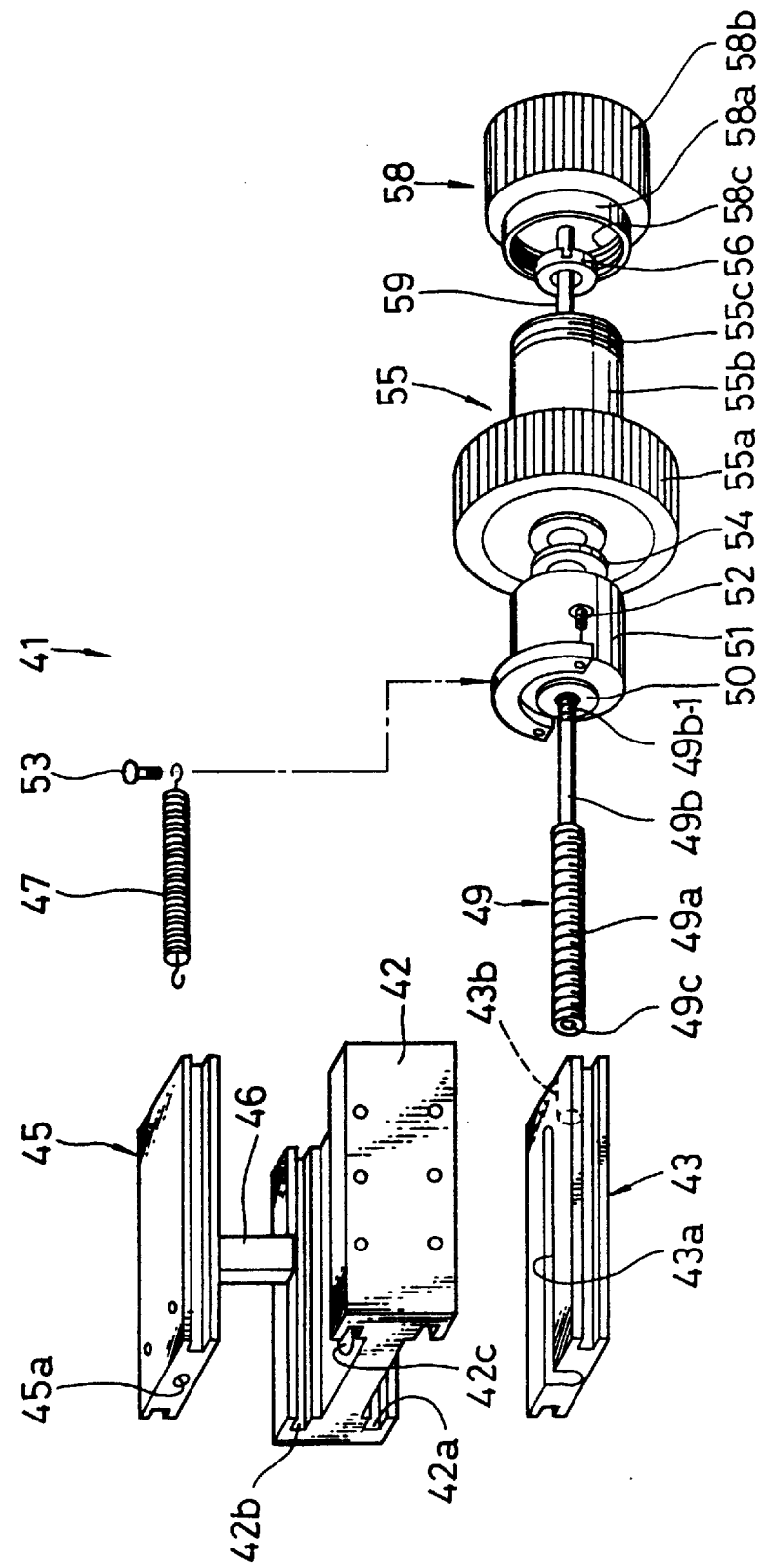
FIG. 4 is a perspective view of disassembled state of conventional slide mechanism enabling rough and fine adjustment.

FIG. 1 and 2 indicate a slide mechanism combined rough and fine adjustment and (a) is a perspective view of the disassembled rough adjustment and fine adjustment mechanism including operation handles and (b) is a perspective view of disassembled parts of the sliders. As shown in FIG. 1 and 2, a slide mechanim 11 comprising rough and fine adjustment has an outside slider 12. The outside slider 12 is provided with grooves 12a. An annular fixing plate 13 is securely fixed to one end of the outside slider 12 by means of bolts 15, 15.

A rough adjustment bearing metal fixing screw 17 is fixed to the fixing plate 13 by means of bolts 16, 16. The rough adjustment bearing metal fixing screw 17 presents annular configuration and male screw 17a is engraved on the periphery thereof.

One end of the rough adjustment bearing metal and concurrently fine adjustment outside slider 20 is fitted to the rough adjustment bearing metal fixing screw 17 by means of annular wave washer 18. Said rough adjustment bearing metal and concurrently fine adjustment outside slider 20 comprises a cylinder part 20a, a flange part 20b provided at the center of the cylinder part 20a, and an engagement part 20c. The engagement part 20c presents a half cut configuration of a thick cylinder in its axial direction. A through hole of the larger diameter of the cylinder part 20a and a through hole of the smaller diameter of the engagement part 20c are communicated.

There are inserted on the periphery of the engagement part 20c a teflon washer 21 of annular configuration, a rough adjustment bearing metal fixing ring 22 and a rough adjustment handle 23 having engraved knurls on the periphery thereof against the flange 20b of the cylinder part 20a of the rough adjustment bearing metal and concurrently fine adjustment outside slider 20.

A female screw 22a is engraved on the inner surface of the through hole of said rough adjustment bearing metal fixing ring 22. The female screw 22a of said rough adjustment bearing metal fixing ring 22 is fitted to the male screw 17a of the rough adjustment bearing metal fixing screw 17.

The rough adjustment handle 23 presents an annular configuration. There are formed annular recessed grooves on the opposite side surface of the rough adjustment handle 23 against the contact surface to the rough adjustment bearing metal fixing ring 22.

A disc shape fine adjustment bearing metal 26 made of brass is fixed to the side end of the engagement part 20c of the rough adjustment bearing metal and concurrently the fine adjustment outside slider 20 by means of screws 25, 25. In addition, the fine bearing metal 26 is closely fixed inside the rough adjustment handle 23. The fine adjustment bearing metal 26 is provided with a recessed groove 26a which communicates to the through hole of the engagement part 20c of the rough adjustment bearing metal and concurrently fine adjustment outside slider 20. A through hole 26b of smaller diameter is provided in the center of the groove 26a.

One end of the periphery of the fine adjustment bearing metal is opened. A cylindrical shaped fine adjustment handle 28 having engraved knurls on the periphery of the other closed side is rotatively fitted. A through hole 28a of smaller diameter is provided in the center of the closed side surface of the fine adjustment handle 28. The through hole 28a and the through hole 26b of the fine adjustment bearing metal 26 are communicated in axial direction. Further, the foremost end of the cylindrical shaped opened side of the fine adjustment handle 28 contacts the annular grooves of the rough adjustment handle 23. The fine adjustment handle is rotatively fitted to the annular grooves of the rough adjustment handle. The inside slider 30 is slidably mounted in the groove 12a of the outside slider 12 with the aid of linear way bearings (not indicated). The inside slider 30 is provided with a female screw 30a in the through hole provided in its movement direction. A rough adjustment male screw 31a of a rough adjustment screw shaft 31 is fitted into the female screw 30a of the inside slider 30.

The rough adjustment screw shaft 31 comprises the rough adjustment male screw 31a and the fixing male screw 31b. A fixing female screw 32a of the fine adjustment inside slider 32 is fitted to the fixing male screw 31b. A fine adjustment male screw 34 of a fine adjustment screw shaft 33 is fitted to a fine adjustment female screw 32b extending in the same axis as the fixing female screw 32a of the fine adjustment inside slider 32.

The fine adjustment inside slider 32 presents semi-cylindrical shape. The slider 32 comprises a fixing female screw 32a provided in the through hole of the same axis as the slider 32, a fine adjustment female screw 32b, and a bearing groove 32c to mount linear way bearings (not shown) provided at both outside ends in parallel with the shaft.

The fine adjustment inside slider 32 is fitted in the through hole of the engagement part 20c of the rough adjustment bearing metal and concurrently fine adjustment outside slider 20 non-rotatively but movably in axial direction by means of linear way bearings (not shown). The fine adjustment inside slider 32 is movably fitted in the recessed groove 26a of said fine adjustment bearing metal 26.

The fine adjustment screw shaft 33 comprises a fine adjustment male screw 34 and a fixing male screw 35 of smaller diameter than the fine adjustment male screw 34. There is formed a step difference at communicated part of the fine adjustment male screw 34 and the fixing male screw 35.

An washer 37 made of plastics such as teflon or the like is inserted into the fixing male screw 35 of the fine adjustment screw shaft 33. The fixing male screw 35 is inserted into the through hole 28a of the fine adjustment handle 28. A fine adjustment screw shaft fixing nut 38 is fitted onto the foremost end of the fixing male screw 35.

As the slide mechanism of the present invention is such constructed as aforementioned, when the rough adjustment handle 23 is rotated by holding the knurls part on the periphery thereof, the rough adjustment bearing metal and concurrently fine adjustment outside slider 20 and the fine adjustment handle 28 are rotated accordingly. The fine adjustment inside slider 32 fitted in the engagement part 20c of the rough adjustment bearing metal and concurrently fine adjustment outside slider 20 is rotated and the rough adjustment screw shaft 31 is also rotated. The inside slider 30 is roughly displaced in axial direction by the female screw 30a fitted to the rough adjustment male screw 31a of the rough adjustment screw shaft 31.

When the operator rotates the fine adjustment handle 28 by holding knurls on the periphery thereof disturbing the rough adjustment handle 23 being rotated, the fine adjustment screw shaft 33 is rotated. The fine adjustment inside slider 32 is finely displaced in axial direction by being disturbed its rotation by means of the engagement part 20c of the rough adjustment bearing metal and concurrently fine adjustment outside slider 20. Accordingly, the rough adjustment screw shaft 31 and inside slider 30 are also finely displaced in axial direction.

Accordingly, rough adjustment and fine adjustment are performed with one slider and one slide mechanism. Size of construction becomes simple and small. Thus, manufacturing cost is reduced.

A simple structure of one slider and one slide mechanism offers high rigidity. It reduces number of hidrance and increases accuracy greatly.

In the aforementioned embodiment the shape of the fine adjustment inside slider is indicated as a semi-cylindrical type. It is of course possible to select rectangular, elliptical type or the like.

ADVANTAGES OF THE INVENTION

As aforementioned, fine adjustment and rough adjustment are possible by one slider and one slide mechanism according to the present invention. Structure becomes simple and small. Thus, manufacturing cost is reduced.

According to the character of this simple structure of one slider and one slide mechanism, high rigidity is obtained. Number of hindrance and troubles or the like is decreased. Reliability and accuracy of the micromanipulator are greatly improved.

What is claimed is:

1. Slide mechanism combined rough and fine adjustment in micromanipulator comprises:

an inside slider provided with a rough adjustment female screw in axial direction and slidably fitted in axial direction in recessed grooves provided in a basic outside slider, a rough adjustment screw shaft fitted into the rough adjustment female screw of the inside slider, a fine adjustment inside slider to fix a basic part of the rough adjustment screw shaft, said fine adjustment inside slider being provided in axial direction with a fine adjustment female screw on the same shaft as said rough adjutment screw shaft, a rough adjustment bearing metal and concurrently fine adjustment outside slider to fit and support the fine adjustment inside slider non-rotatively but movably in axial direction in a through hole provided in axial direction, a fine adjustment screw shaft fitted to a fine adjustment female screw of the fine adjustment inside slider, an annular rough adjustment operation handle to rotate the rough adjustment bearing metal and concurrently fine adjustment outside slider, a cylindrical shaped fine adjustment operation handle to rotate the fine adjustment screw shaft, and the rough adjustment operation handle is rotated and the rough adjustment bearing metal and concurrently fine adjustment outside slider and the fine adjustment inside slider are rotated and then the inside slider is roughly displaced in axial direction, the fine adjustment operation handle is rotated and the fine adjustment screw shaft is rotated and then the fine adjustment inside slider is finely displaced in axial direction and further the inside slider is finely displaced in axial direction.

* * * * *